(12) United States Patent
Chen

(10) Patent No.: US 6,744,532 B1
(45) Date of Patent: Jun. 1, 2004

(54) METHOD FOR ENHANCING PRINTING QUALITY

(75) Inventor: Cheng Chong Chen, Taipei (TW)

(73) Assignee: Lite-On Technology Corporation, Taipei (TW)

(*) Notice: Subject to any disclaimer, the term of this patent is extended or adjusted under 35 U.S.C. 154(b) by 0 days.

(21) Appl. No.: 09/386,426

(22) Filed: Aug. 31, 1999

(51) Int. Cl.⁷ .............................. G06K 1/00; G06F 15/00
(52) U.S. Cl. ..................... 358/1.9; 382/167; 382/252; 382/266; 382/270; 382/199; 358/465; 358/466; 358/518; 358/3.03; 358/3.15
(58) Field of Search ................................ 382/199, 162, 382/165, 167, 270, 166, 143, 266, 264, 269, 268, 252; 358/3.03, 1.9, 2.1, 3.15, 465, 466, 518–523; 348/441, 469.1, 603, 604; 345/600, 605

(56) References Cited

U.S. PATENT DOCUMENTS

| 5,134,667 A | * | 7/1992 | Suzuki | 382/164 |
| 6,094,508 A | * | 7/2000 | Acharya et al. | 382/199 |
| 6,281,875 B1 | * | 8/2001 | Zhao et al. | 345/611 |
| 6,408,109 B1 | * | 6/2002 | Silver et al. | 382/300 |

* cited by examiner

*Primary Examiner*—Kimberly Williams
*Assistant Examiner*—Melanie Vida
(74) *Attorney, Agent, or Firm*—Rosenberg, Klein & Lee

(57) ABSTRACT

A method for enhancing printing quality to process the picture and textual data in an image properly such that both the picture and textual data can be clearly printed. The inventive method can treat the image data to be printed in a real time fashion and while the entire image data is not required. In the inventive method, the difference of gray level is reallocated by error diffusion method to render the edge more smooth and clear.

6 Claims, 12 Drawing Sheets

FIG. 11a

| 255 | 255 | 191 | 127 | 63 | 0 | 0 |
|---|---|---|---|---|---|---|
| A | B | C | D | E | F | G |

FIG. 11b PRIOR ART

| W W | W W | W W | W W | W B | B W | W B | B B | B B | B B | B B |
|---|---|---|---|---|---|---|---|---|---|---|
| W W | W W | W W | W W | B W | W B | B W | B B | B B | B B | B B |

| W W | W W | W W | W W | W B | B W | W B | B B | B B | B B | B B |
|---|---|---|---|---|---|---|---|---|---|---|
| W W | W W | W W | W W | B W | W B | B W | B B | B B | B B | B B |

A B C D E F G

METHOD FOR ENHANCING PRINTING QUALITY

BACKGROUND OF THE INVENTION

The requirement for printing quality becomes more demanding as the uses of printer and scanner become frequent. The printing operation is required to be both fast and clearly. The most frequently used halftone methods for conventional printer are as below.

1. Ordered Dither

The image in a specific region is encoded in dot format to simulate gray level visually, that is, increasing gray level at the expense of reducing resolution.

2. Error Diffusion

By using gray level error of pixels along a specific direction, the next pixel is determined to be black or white by accumulation of error of specific ratio.

However, the above-mentioned methods do not provide satisfactory printing quality for text even thought they are quite good for picture. To overcome this problem, much effort has been devoted to this study, for examples, U.S. Pat. Nos. 4,411,015, 4,503,556, 4,504,972, 4,513,442, 5,091,964, 5,280,367, 5,335,290, 5,375,197, and 5,381,241. In above patents, the division of textual and picture block is executed by combining and separating pixel according to the similarity or connection of gray level. The divided block is further judged to be text or picture by histogram or shape thereof. However, considerable data such as data of the whole page is required for correct division, thus being not suitable for FAX machine or copier which require real-time printing.

Moreover, the above problem can be overcome by setting the edge threshold according to the forepassed statistical data and forcing the division of edge, however, the printing result has blurred or discontinuous edge.

It is an object of the invention to provide a method for enhancing the printing quality or gray-level text or RGB color text while the printing quality of picture is not influenced.

It is another object of the invention to provide a method for enhancing printing quality with adaptive edge threshold, wherein the edge feature of the row of pixels being processed is used to modify the edge threshold of the next row of pixels, thus providing real time printing.

It is another object of the invention to provide an algorithm to choose a most preferred edge feature among several edge feature to remove direction difference from the operation of edge operator and edge roughness from error diffusion.

The various objects and advantages of the present invention will be more readily understood from the following detailed description when read in conjunction with the appended drawing, in which:

BRIEF DESCRIPTION OF DRAWING

FIG. 11 shows the difference after error diffusion enhancing the printing quality.

DETAIL DESCRIPTION OF PREFERRED EMBODIMENT

The present invention is intended to provide a method for enhancing the real-time printing of text while the printing quality of picture is not influenced such that the method can be advantageously used for printing, FAX, copying and image processing.

Figure 1:
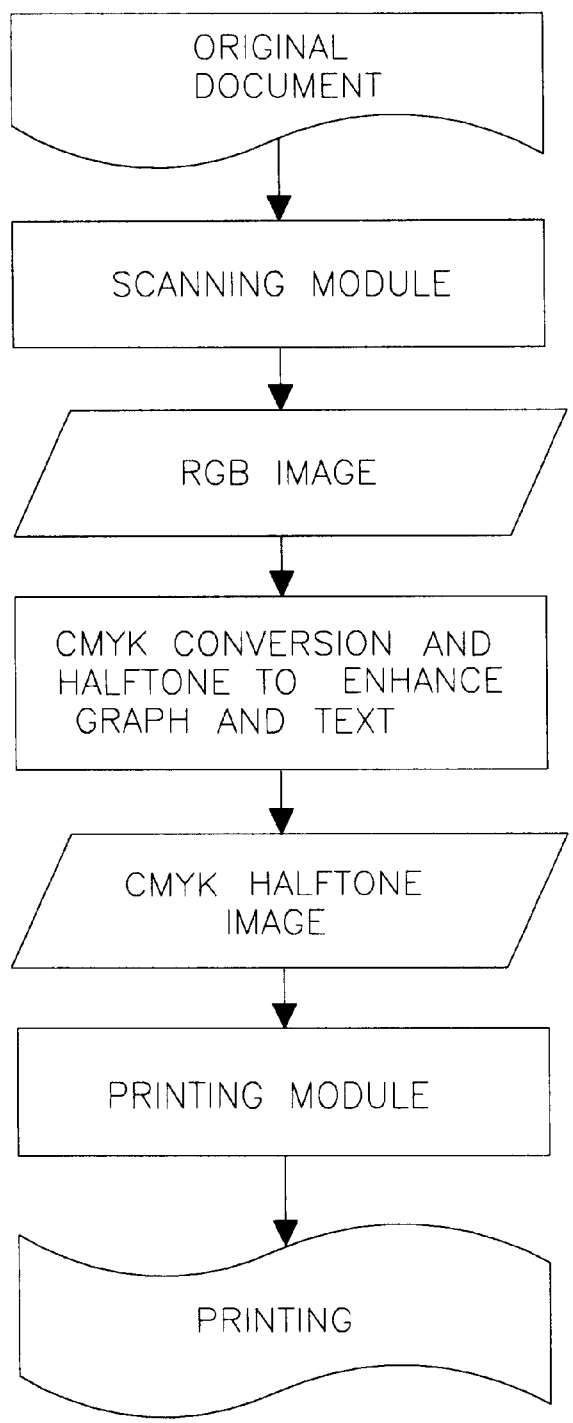
FIG. 1 is a flowchart of a conventional color printing.
Figure 2:
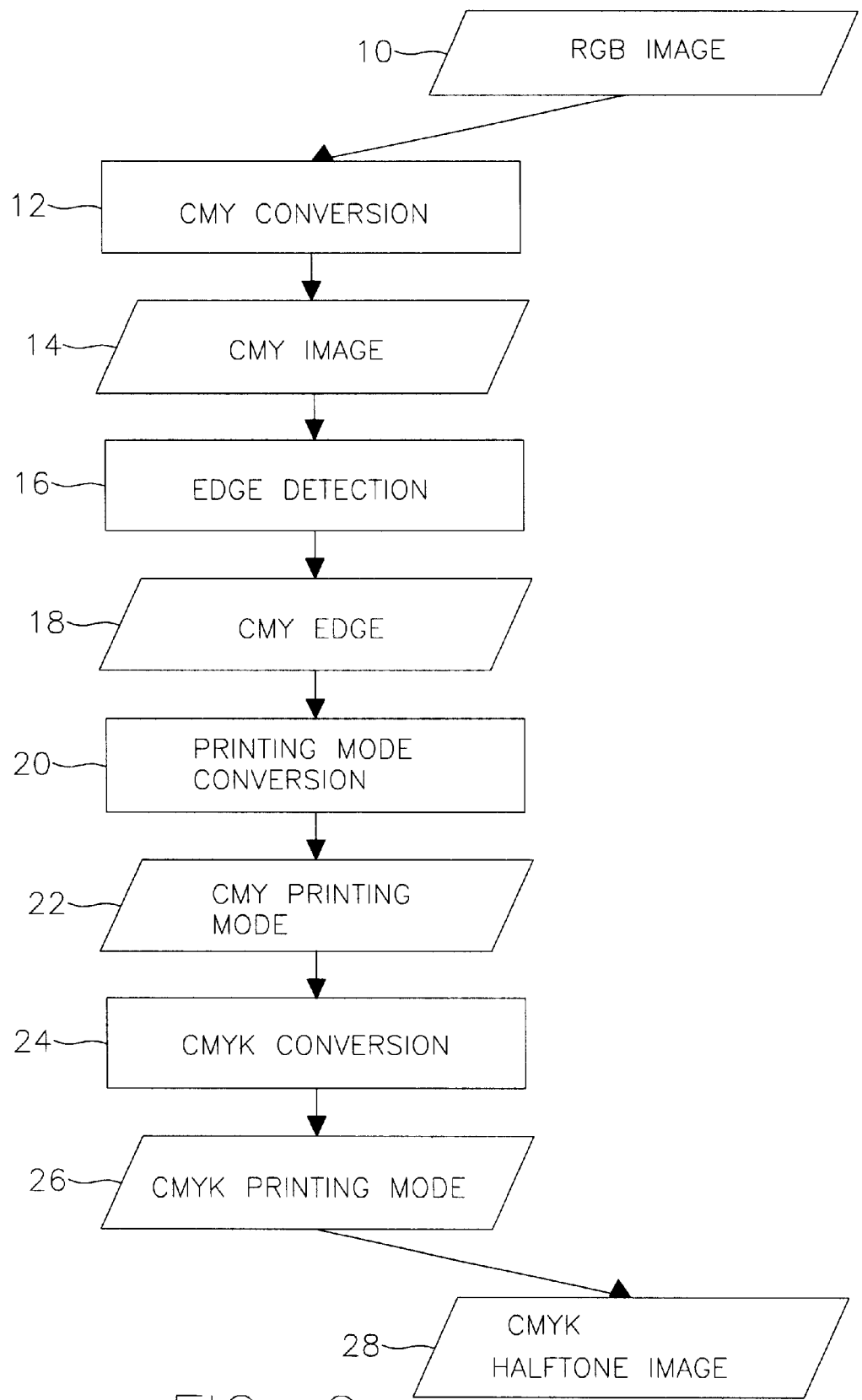
FIG. 2 is the flowchart of the resent invention.

As shown in FIG. 1, taking color copying as example, the document is firstly scanned and sampled to produce digital RGB data, and the RGB data is subjected to CMKY transform, halftone process and picture-textual enhancing process to generate CMKY halftone image, finally the CMKY halftone image is sent to printer for printing. For low end color printer, the resolution is 600 dpi and the CMKY color dot is classified to be printed or not to be printed. Therefore, the scanned document is required to have text-enhancing treatment to outline the textual printing while not influencing picture printing.

The general document can be classified into two categories. The first kind of document has obvious edge such as text, line, symbol, which has abrupt color and gray level. The second kind of document has no obvious edge such as picture or picture data which has plentiful variation of color and gray level.

According to the above-mentioned difference between two kinds of documents, the text document can be separated from the picture document by the existence of an edge. FIGS. 2, 3, 4 and 5 show a preferred embodiment of the invention when applied to a color image. The flowcharts according to the present invention for an RGB color image is as follows:

A. CMY Transform:

The RGB image from block 10 is subjected to a CMY transform in block 12, to convert the RGB image to the CMY image of block 14, before printing. In fact, the printing operation adopts a CMKY mode, however, the K color utilizes part of the other three colors (CMY). This makes the edge detection difficult. In the present invention, the procedure begins with a simple CMY transform in block 121 of FIG. 3 to produce the CMY image in block 14, wherein f(x) is the gray level of pixel x:

$$\begin{bmatrix} f_C(x) \\ f_M(x) \\ f_Y(x) \end{bmatrix} = 255 - \begin{bmatrix} f_R(x) \\ f_G(x) \\ f_B(x) \end{bmatrix}$$

B. Edge Threshold:

In general, an edge threshold is required to judge the existence of an edge, wherein the set up of the edge threshold depends on past experience or the statistical value of the whole page of a document. This makes real-time printing difficult. In the present invention, the edge feature of the row of pixels being processed in the edge detection step of block 16 is used to modify the edge threshold for the next row of pixels, thus providing real time printing.

Figure 3:
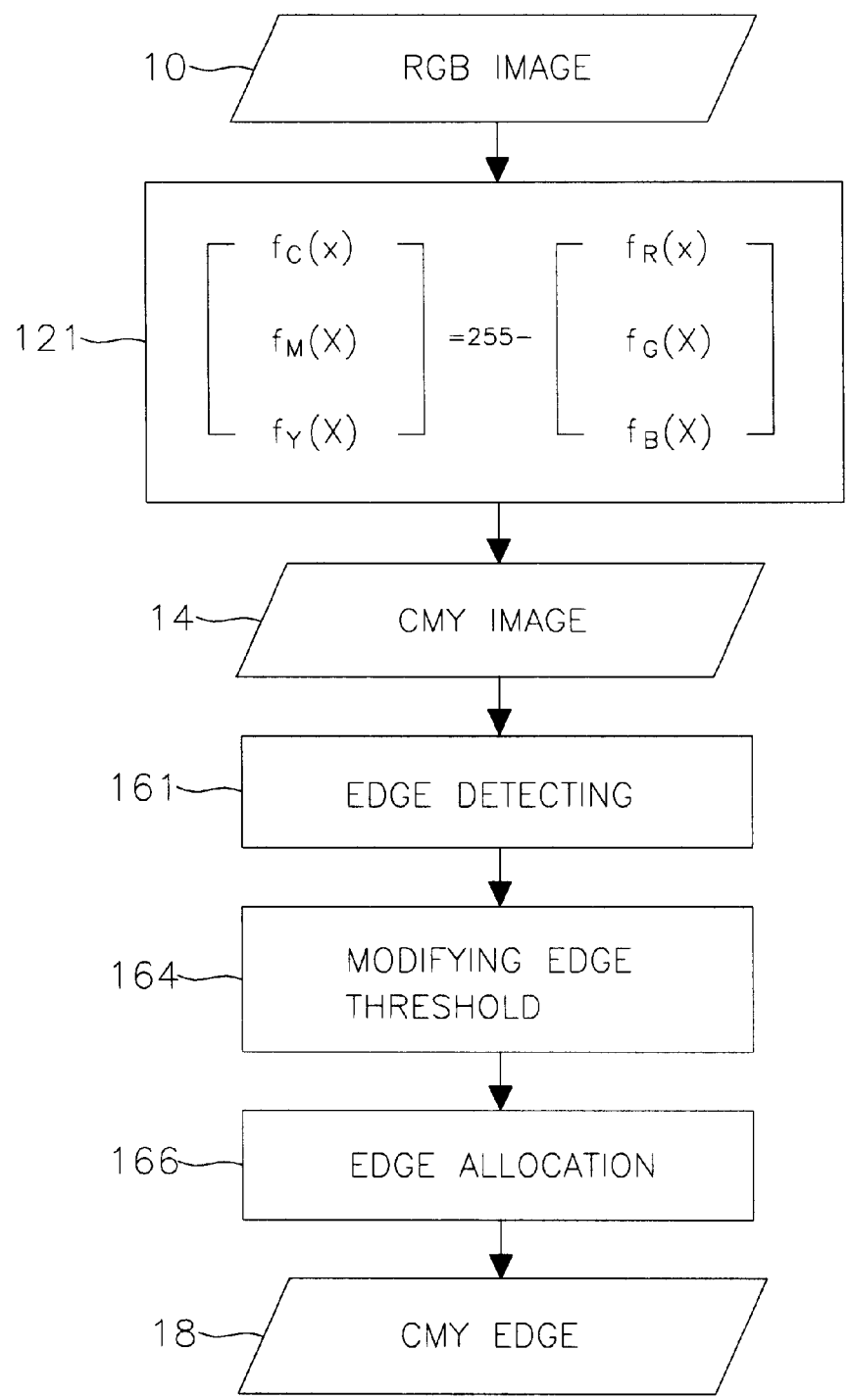
FIG. 3 shows RGB and CMY conversion and edge detection.
Figure 4:
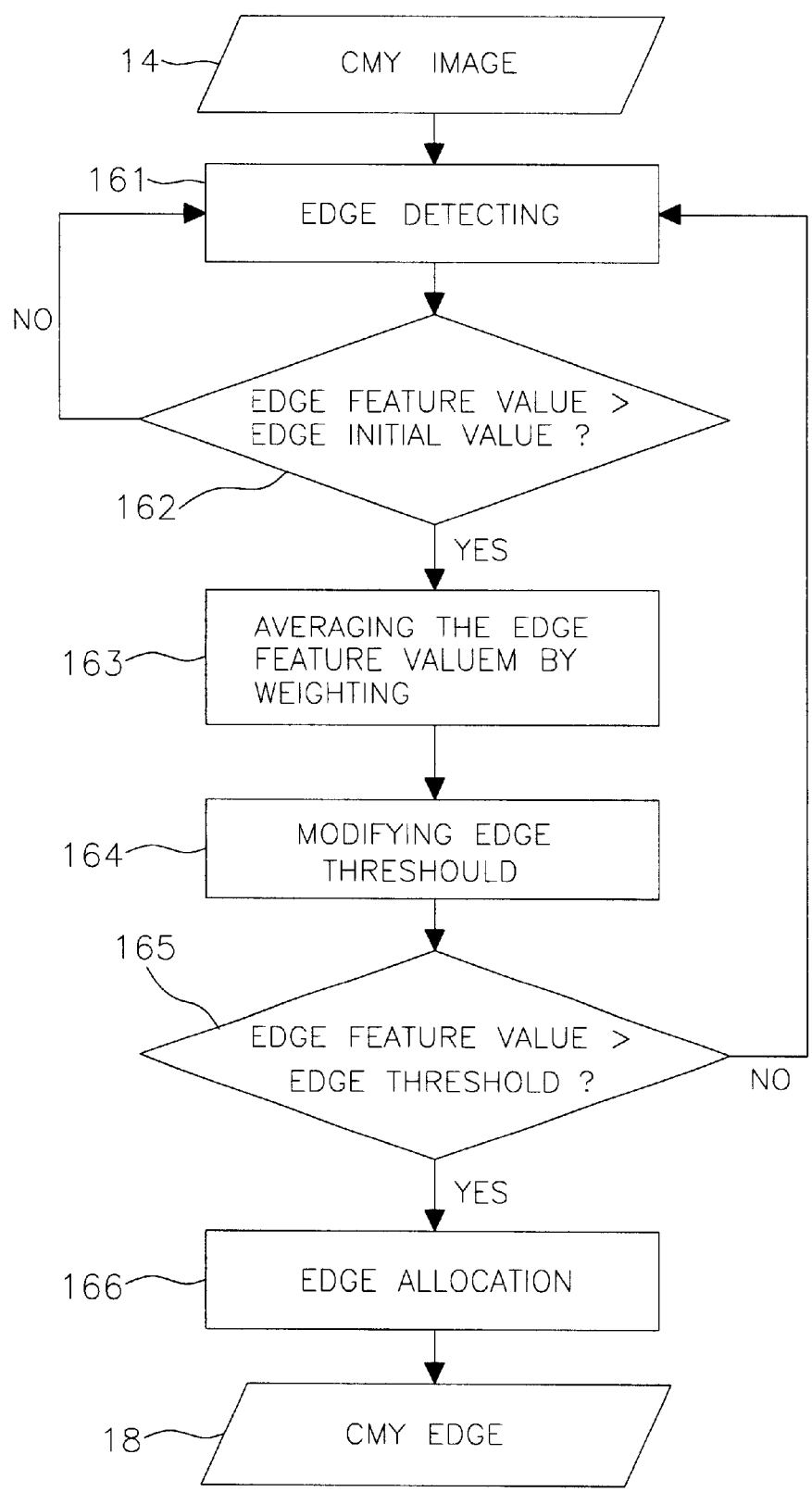
FIG. 4 is the flowchart of edge threshold calculation.

Firstly, with reference to FIGS. 3 and 4, the initial edge threshold is determined by past experience and a 3 by 3 edge operator is used to find the edge feature including pixel coordinate, edge direction, and edge feature value, in block 161. When the edge feature value is tested in block 162 and is larger than the initial edge threshold, the averaged edge feature value is weighted in block 163. After a row of image is processed, the edge threshold is modified in block 164 by the weighted average established in block 163. If the edge threshold is smaller than the initial edge threshold in block 162, the edge threshold is set to be the initial edge threshold in block 161, and the process repeats.

C. Edge Detection and Distribution:

In the present invention, a 3 by 3 edge operator is used to detect edge characteristics. More particularly, the present invention uses the directive feature of the edge for edge distribution in block 166. The present invention uses two bytes of data to record a feature for a pixel including the location of a black pixel, edge modification coefficient, and direction feature of black and white pixels.

Figure 5:
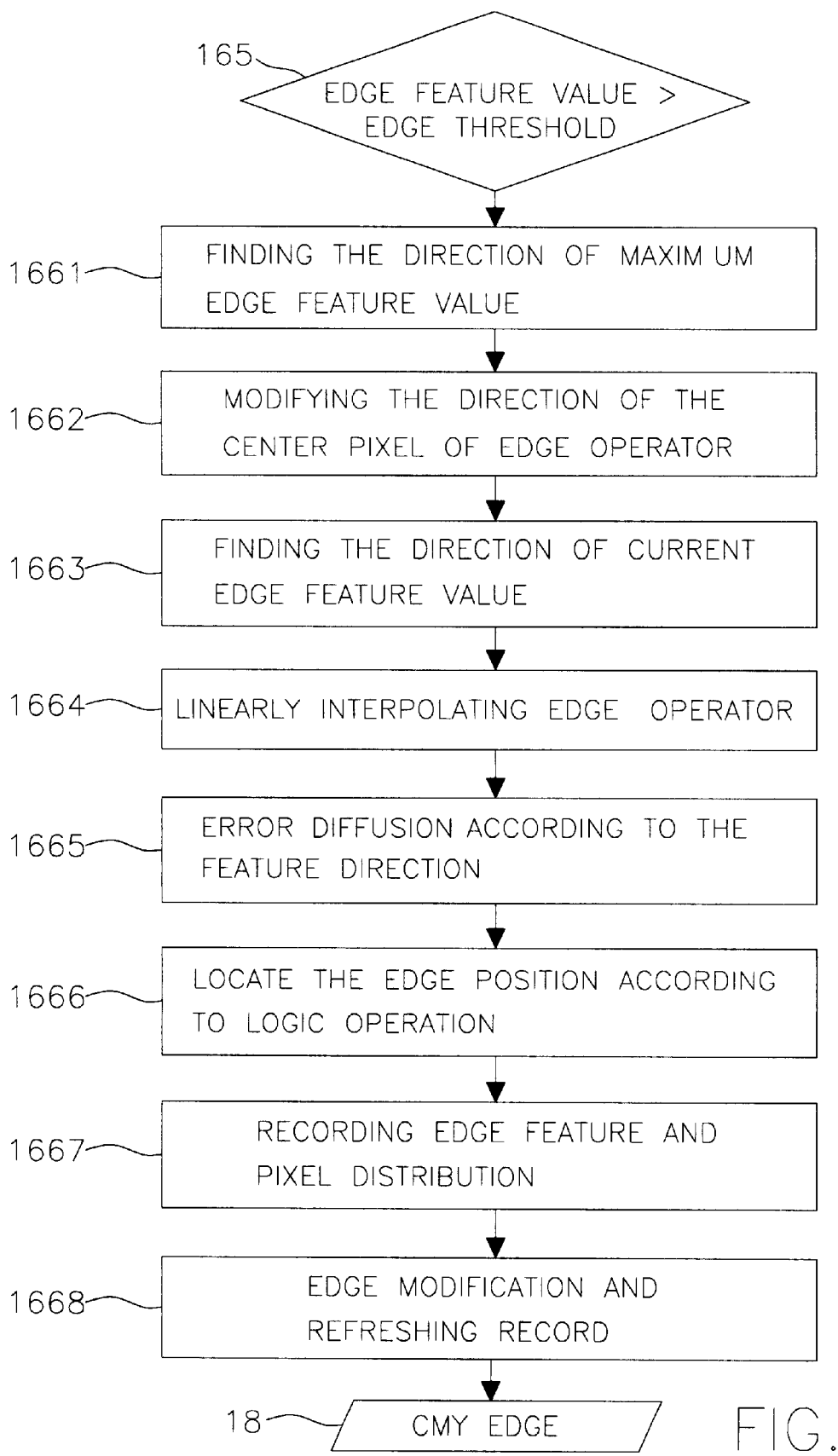
FIG. 5 is the flowchart of edge allocation.

Referring additionally to FIG. 5, when the edge feature value is tested in block 165 and is larger than the edge threshold, the direction of maximum edge feature value is firstly found and the maximum edge feature value is encoded in the center of the pixels according to pixel distribution principle in block 1661. The center pixel of the edge operator is recorded and the original information allocated in the center pixel is cleared in block 1662. Afterward, the direction distribution for other pixels are executed and the edge features are allocated to edge pixels in block 1663.

D. Distribution of Direction Characteristic:

For a general image, the gray level is increased when a dark pixel is at the left and a light pixel is at the right. For a realistic image, several edge pixels with an edge feature value larger than the edge threshold might be obtained after the edge operation. How the black and the white pixels are located at the correction position is important to printing quality. The present invention proposes an algorithm to choose a most preferred edge feature out of several edge feature values to remove the direction difference caused by the operation order of the operator and the edge roughness.

The proposed algorithm uses the directive of each pixel for AND(&) or OR(|) operations in block 1666 subsequent to the interpolation and error diffusion steps of blocks 1664 and 1665, described in following paragraphs. For example, for an edge in an image, when the darker pixel is on the left side and the lighter pixel is on the right side, and after the edge operation from the top down and from left to right, if the edge feature is on the left side, the inventive procedure checks whether the left pixel of the edge operator has the feature of a white pixel on the left side. If true, it means that the left pixel is set to be a white pixel. Because the pixel in the direction is set to be a white pixel, the following center pixel is set to have feature of a white pixel on the left side.

If the above answer is false, the feature of a black pixel on the left side is written into the left pixel or the center pixel of the edge operator by the interpolation, block 1664, and error diffusion, block 1665, methods.

When the feature of a black pixel on the left side is to be written into the center pixel, the feature of a black pixel on the left side for the left pixel should be cleared to prevent the repeating of the feature of the black pixel on the left. Moreover, the feature of a white pixel on the left for the center pixel should also be cleared. Afterward, the feature of the black pixel on the left is written into the center pixel, and the feature of a white pixel on the left side is written into the right pixel in block 1667.

If the feature of a black pixel on the left side is to be written into the left pixel of the edge operator, the left pixel is unchanged if it already has the feature of a black pixel on the left side. Otherwise, the feature of a black pixel on the left side is written into the left pixel and the feature of a white pixel on the left side is written into the center pixel.

If a new edge feature appears and the directive is not left, the feature distribution is the same, nevertheless, the process is different.

E. Interpolation and Error Diffusion:

The data obtained through scanning is generally at a 300 dpi resolution, and the normal printing resolution is 600 dpi. The 300 dpi image is converted to a 600 dpi CMKY image before printing. However, the conversion process is time consuming and requires lots of memory. Most importantly, the edge feature is lost. In the present invention, an interpolation scheme is used to linearly interpolate the pixel of the 3 by 3 edge operator into 6 b 6 pixel in block 1664. Moreover, an error diffusion method in block 1665 is used to determine whether the feature of a black pixel in the r direction is to be written to the r-direction pixel or the center pixel of the edge operator, and determine the position distribution of the black pixel. In the error diffusion scheme, the gray level after interpolation is either printing (gray level=0) or non-printing (gray level=255), the error value is equal to the value of printing subtracting the gray level after interpolation and the error value is propagated to the pixel of the next interpolation point by a propagation coefficient (t), when the gray level error is accumulated from a value not larger than 127 to a value larger than 127 or vice versa, an edge exists in the interpolating pixel. By using this scheme, the feature of a black pixel in the r direction can be determined to write into the r-direction pixel or the center pixel of the edge operator.

As to the location distribution of the black pixel, the position of the black pixel for the redirection pixel or the center pixel is determined whether it matches with the directive thereof by the error diffusion principle. In general, the position of the black pixel is matched with the directive thereof, the modification of the black pixel position should be performed even when the accumulation of gray level is not enough, thus preventing edge shift. Therefore, the pixel position can be more realistically matched with the gray level of the real image.

F. Edge Modification:

Because of the resolution difference of the original image compared with the printing image, the edge along the same direction may have one pixel difference for a low-resolution image, but for a high-resolution image may have two or more pixel differences, therefore the edge of image appears discontinuous. The present invention uses two rows of data with a direction feature to solve this problem in block 1668 to define the edge of the CMY image (block 18). The data diagonally adjacent are checked whether they have the same black pixel directive. If true, the edge pixel is not continuous and one of the diagonally adjacent data is to be modified to present a continuous edge.

G. Conversion of Printing Mode:

If the printing mode is changed, the directive feature of the edge pixel should be relocated to enhance printing quality in block 20. The 300 dpi RGB image should be subjected to proper conversion to obtain a 600 dpi printing effect. Therefore, the direction of the edge pixel should be converted to present a 600 dpi effect. In general, each pixel has 8 adjacent pixels, in other words, 8 directions. In the normal printing mode, a pixel of the original image generates 4 positions. Therefore, the information of 8 adjacent pixels should be distributed to those four printing positions. The present invention uses a byte to encode the possible position allocation under the normal printing mode, including allocation of black and white pixels, and allocation of black and white pixels for edge modification.

Figure 6:
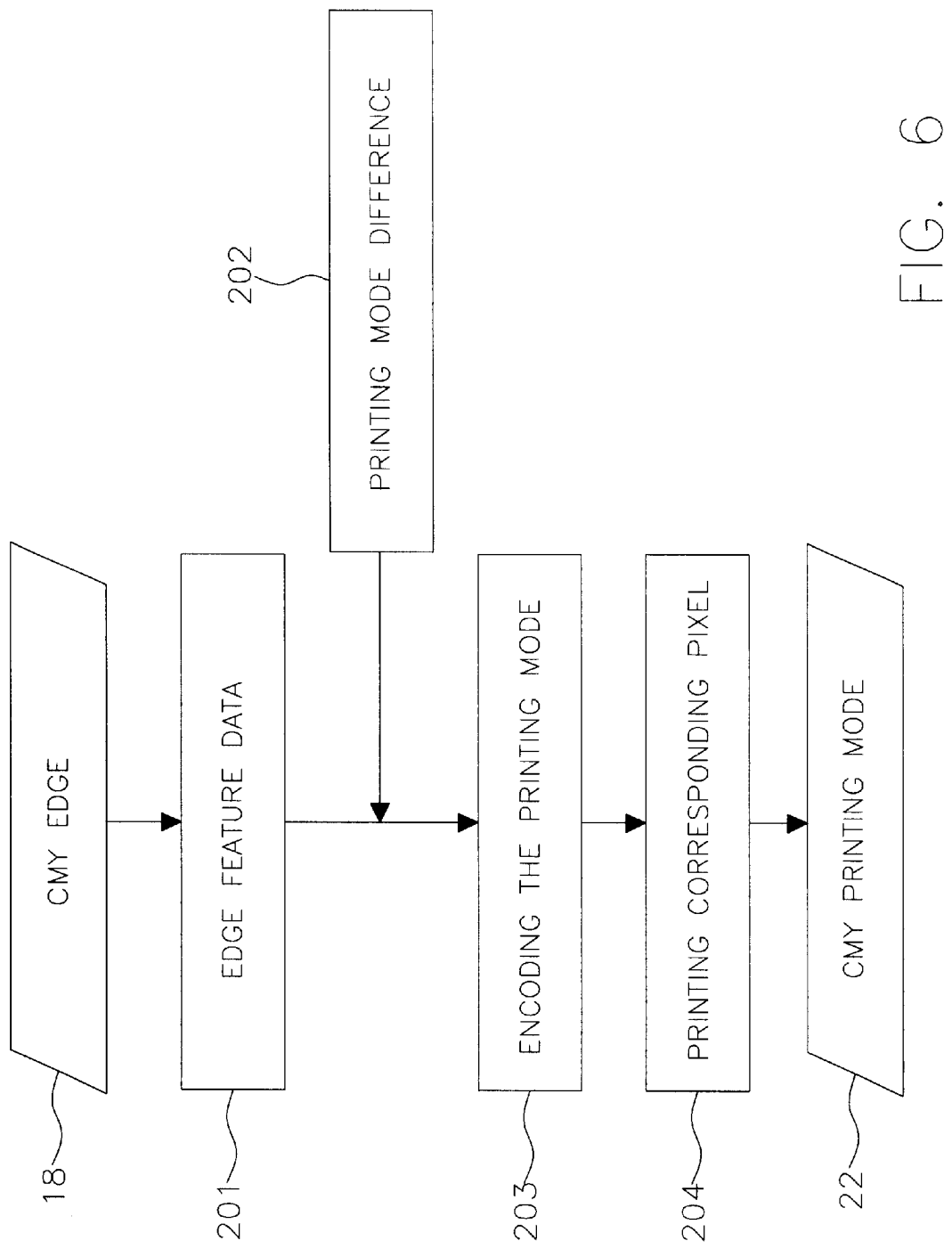
FIG. 6 is the flowchart of printing mode conversion.

In other words, with reference to FIG. 6, for the pixels of the original image, each edge pixel has two bytes of data for recording the edge feature in block 201 and this two byte feature data corresponds to a byte of printing data according to the difference of the printing mode in block 202. In block 203, a byte is used to encode the printing mode, followed by establishing the printing data in block 204 to enter the CMY printing mode in block 22.

Figure 7:
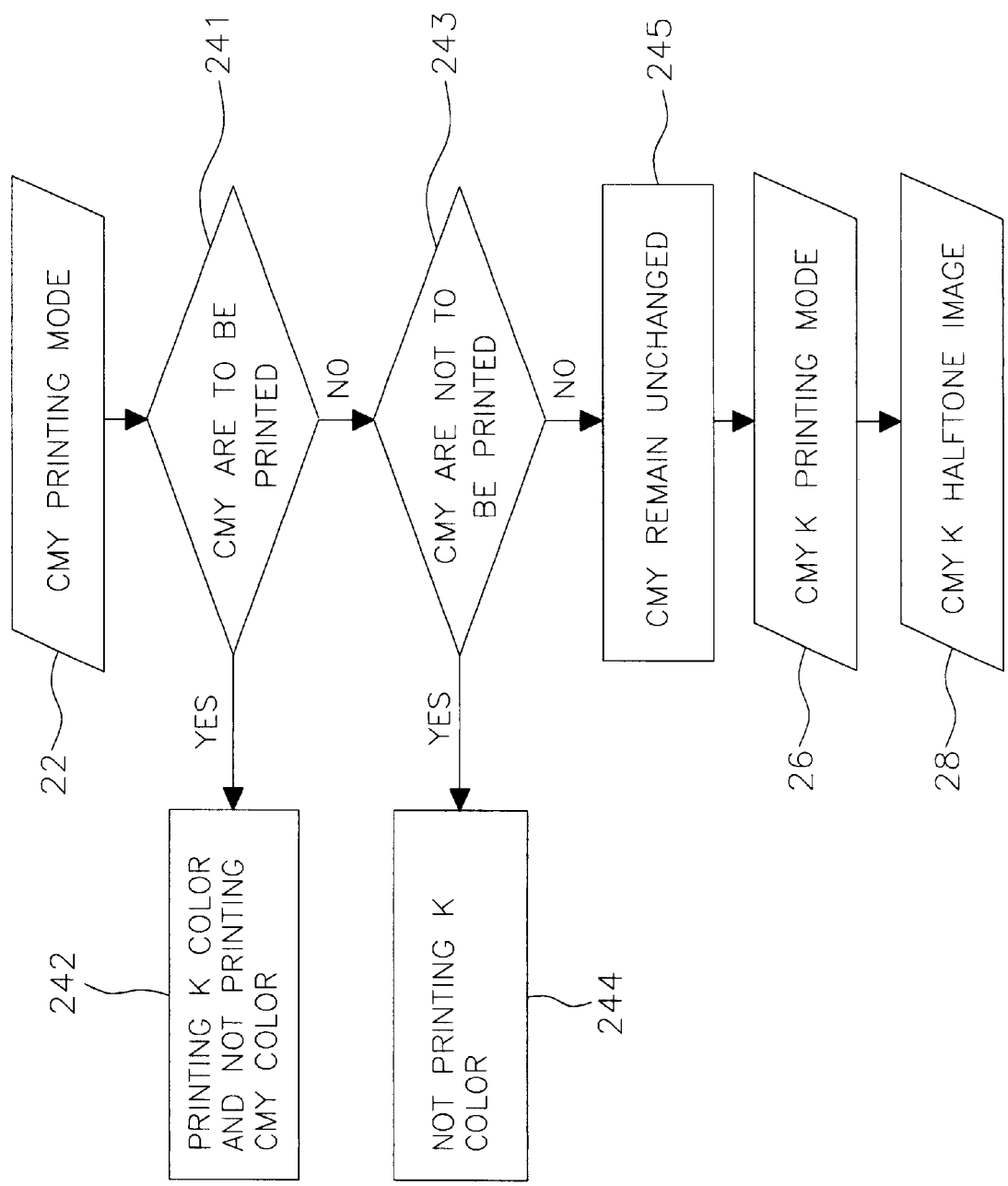
FIG. 7 is the flowchart of CMY and CMKY conversion.

H. CMKY Conversion:

The result in the above steps results in the edge pixel distribution of the CMY printing mode in block 22. However, the real printing mode is the CMKY mode (block 26). Therefore, it is necessary to convert, in block 24, the edge pixel distribution of the CMY mode to reduce the color ink consumption of a color printer, and prevent the overlapping error of CMY color in the CMYK halftone image in block 28. Referring to FIG. 7, the conversion steps of block 24 are detailed as follows. In the printing mode and when a pixel has an edge feature and the CMY colors are to be printed, as tested in block 241, then the CMY colors are replaced by the K color to print in block 242. When a pixel has an edge feature and the CMY colors are not to be printed, as tested in block 243, then the K color is not printed in block 244. When the pixel has no edge feature, the printing condition is not changed in block 245.

Figure 8:
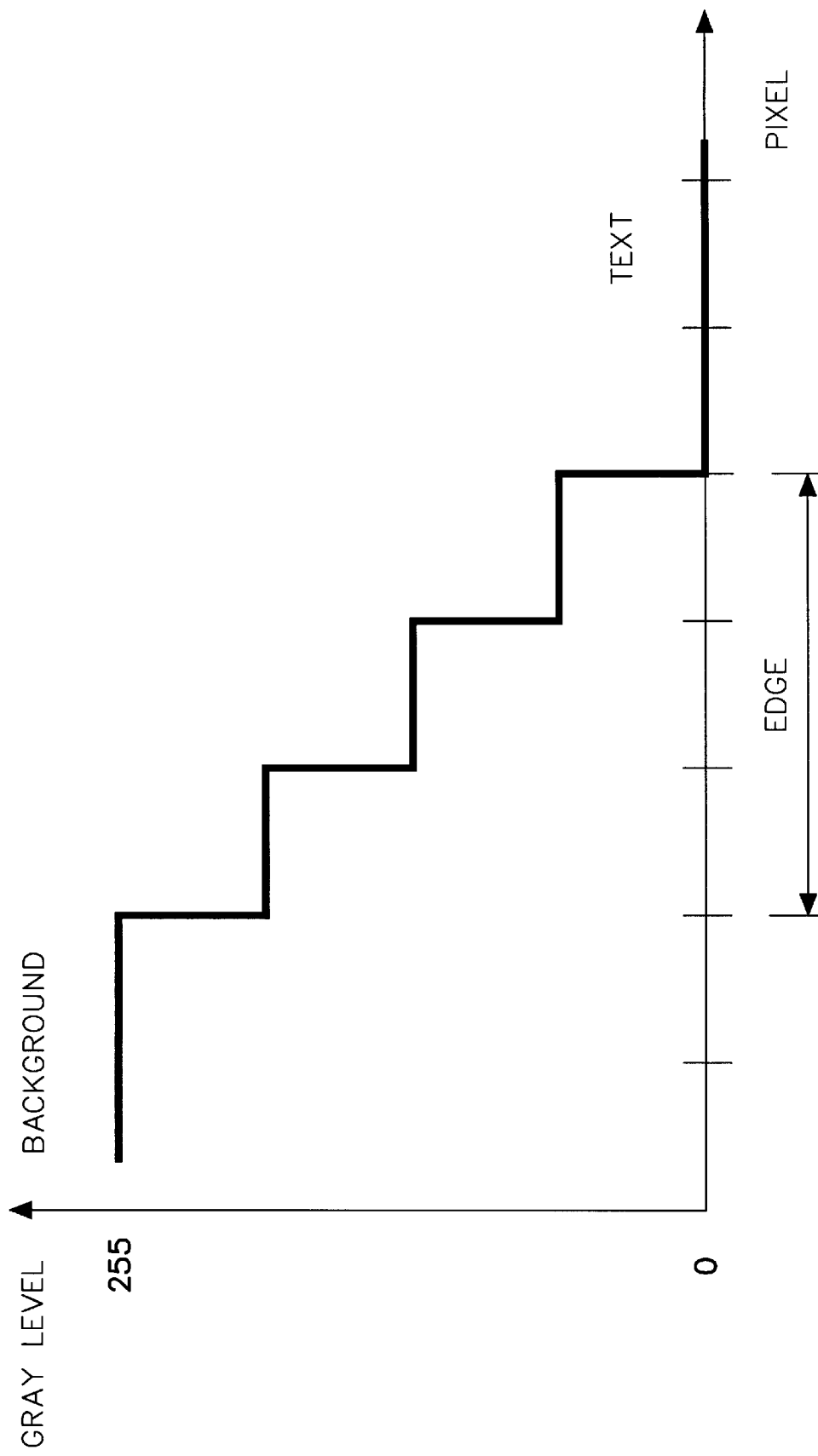
FIG. 8 shows the changes of gray level of a scanned image.
Figure 9:
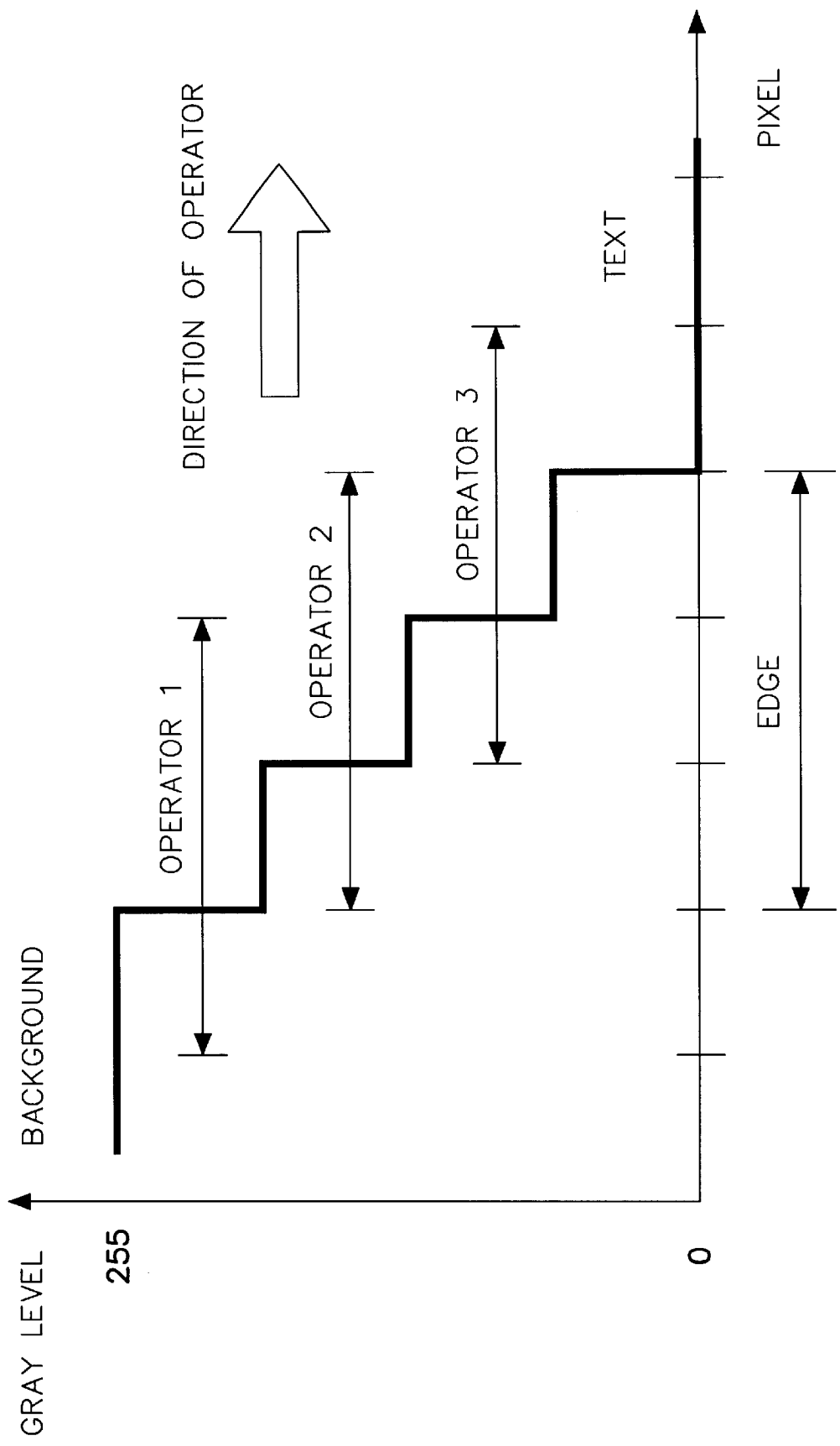
FIG. 9 shows the 3 by 3 edge operator detection for image in FIG. 8.
Figure 10:
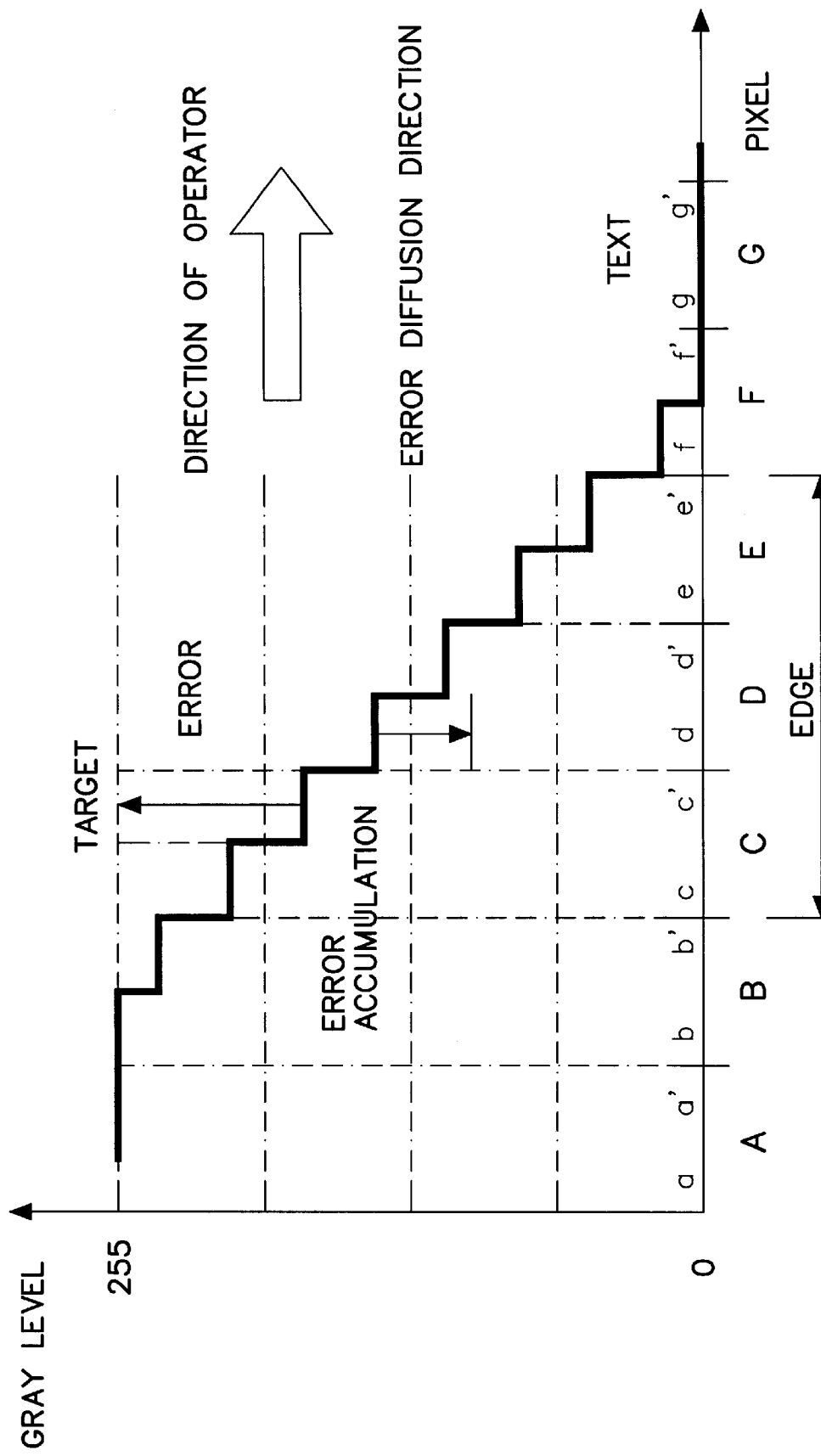
FIG. 10 shows the steps of error diffusion along the edge feature.

A preferred embodiment is described below with reference to FIGS. 8–11. Assuming that the image is monochromatic gray level image and a scanned 300 dpi image has gray level as shown in FIG. 8 and a 3 by 3 edge operator is used. The gray level shown in FIG. 8 has variation from 255 to 0 to manifest the existence of an edge. FIG. 9 shows the procedure, provided that the 3 operators shown in FIG. 9 generate edge feature value larger than the edge threshold, a most preferred edge should be found among those results. FIG. 10 shows the procedure and provided that the diffusion coefficient is 0.5.

In first step, it is known that the edge feature value of operator 1 is larger than the edge threshold, the pixel distribution coding obtained from the largest edge feature value is recorded in pixel C and then performing interpolation to the edge operator 1. If the gray level b' after interpolation is not to be printed (gray level 255), the error (255–b') multiplied by the error coefficient 0.5 is diffused to gray level c. As shown in this figure, the accumulation of gray level error in gray level c is larger than 127, showing a white-like color; if the gray level of c is not to be printed (gray level 255), the error (255–c') multiplied by the error coefficient 0.5 is diffused to gray level d. It is found that the gray level d is smaller than 127 (black-like). In other word, the gray level becomes black from white, as moving from pixel C to pixel D. Therefore, an edge exists. A record of white pixel on right side is stored in pixel C, and a record of black pixel on right side is stored in pixel D.

Moreover, the error diffusion method is used to determine whether the edge direction of the pixel D requires modification. That is the gray level c' is assumed to be not printed. The error (255–c') multiplied by the error coefficient 0.5 is diffused to gray level d, it is found that the accumulation of gray level error in gray level d is smaller than 127 (black-like), the black pixel of edge is allocated in direction of gray level d, rather than direction of gray level d'.

In second step, the operator 2 is performed after the operation of the edge operator 1. It is found that the edge feature of the operator 2 is larger than the edge threshold, meaning an edge exist. Firstly, the pixel allocation coding obtained with reference to the max edge feature value is recorded in pixel D, then performing interpolation on edge operator 2 with error diffusion principle. The result is that gray level turns from white to black as moving from pixel C to pixel D. Nevertheless, pixel C and D have record of edge feature, the record thereof require modification with logic operation, that is, increasing new direction feature and preserving the same feature. Finally, the error diffusion method is again used to determine whether the edge allocation direction requires modification, the result is the same as that in first step.

The third edge operator 3 is performed after the end of the second edge operator 2. It is found that the edge feature of the operator 3 is larger than the edge threshold, meaning an edge exist. Firstly, the pixel allocation coding obtained with reference to the max edge feature value is recorded in pixel E. The pixel of white edge direction (pixel D) is examined. If the pixel has record of black pixel on right side, which shows the existence of an edge, no modification is required.

Combining above steps, the pixel C records the data of white pixel on right side and pixel D records black pixel on right side, and the direction is modified toward left. Provided that the above 300 dpi edge image has gray level distribution as shown in FIG. 11a, after the conventional error diffusion process and 600 dpi printing, the result is shown in FIG. 11b, wherein W represents not printing and B represents printing. As shown in this figure, the edge is not apparent. FIG. 11c shows the edge feature after the process of the present invention, the record in pixel C with white pixel on right side is encoded to not-printing, and the record in pixel D with black pixel on right side and the direction is modified toward left direction. As shown in FIG. 11c, the edge is more smooth and more apparent.

Figure 12A:
FIG. 12 shows the effect of the invention.
Figure 12B:

FIG. 12 shows the effect of the invention. FIG. 12A shows the printing result of a scanned image without treatment by the present invention, and FIG. 12B shows the printing result of a scanned image with treatment by the present invention. As can be seen from these figures, the edge of the printing result is more smooth and clear by the present invention.

Although the present invention has been described with reference to the preferred embodiment thereof, it will be understood that the invention is not limited to the details thereof. Various substitutions and modifications have suggested in the foregoing description, and other will occur to those of ordinary skill in the art. Therefore, all such substitutions and modifications are intended to be embraced within the scope of the invention as defined in the appended claims.

I claim:

1. A method for enhancing printing quality of gray level and color images, comprising the following steps:

A) performing a CMKY halftone process wherein a document to be printed is converted to a CMKY image and a halftone process is carried out for each CMKY color to determine a color of a pixel in an image to be printed;

B) performing a CMY conversion wherein the document to be printed is converted to a CMY image to detect an edge in each CMY color simultaneously;

C) performing an edge detection by determining a presence of an edge feature by a gray level difference in the document to be printed, no process being carried out if no edge feature is detected, an edge feature being recorded if the edge feature is detected;

D) allocating a feature record of an edge pixel according to a change in a printing mode to determine whether each edge pixel is printed; and E) performing a conversion of CMY edge pixels to CMKY edge pixels; wherein said edge detection step includes the steps of:

determining an initial value of the edge feature;

calculating image data covered by an m by n window wherein m and n are integers between 2 and 5, an edge threshold is modified by edge feature of an edge gray level difference by an edge operator, and the feature record of an edge pixel is found by an edge directive from the edge operator;

modifying the edge threshold responsive to an edge feature value in a row being larger than an initial edge threshold, the edge threshold being modified by being weighted and provides the edge threshold of next row of the image data;

recording the edge feature of a pixel using two bytes of data, the data including a location of a black pixel, and edge modification coefficient, and the direction of the black pixel and a white pixel;

responding to an existence of an edge within the image data of the m by n window, where the edge is established by the edge feature value being larger than the initial edge threshold, the edge feature being recorded in a preferred pixel by an interpolation and error diffusion method; and, modifying the edge feature value using two rows of data with a direction feature responsive to two diagonally adjacent data represent black pixels and the same edge directive, one of the two diagonally adjacent being modified such that the edge direction of the two diagonally adjacent data are near a center of an adjacent point.

2. The method as in claim 1, when the edge feature value is larger than the initial edge threshold, said interpolation linearly interpolates a gray level of image data in the m by n window to generate a gray level pixel of a 2m by 2n window.

3. The method as in claim 2, when the gray level of image data in the m by n window are converted to gray level pixel of 2m by 2n with interpolation, the interpolated gray level is black or white, depending on the edge directive, and an error is accumulated to a next interpolated pixel, the edge feature is established in the m by n window to record the edge feature when a color of the gray level after error accumulation is turned from black to white or vice versa.

4. The method as in claim 2, wherein if a record of an edge feature exists within the m by n window, then an OR operation is used to preserve a record of a different edge feature, and an AND operation is used to clear a record of an identical edge feature.

5. A method for enhancing printing quality of gray level and color images, comprising steps as follows:

A) performing a CMKY halftone process wherein a document to be printed is converted to a CMKY image and a halftone process is carried out for each CMKY color to determine a color of a pixel in an image to be printed;

B) performing a CMY conversion wherein the document to be printed is converted to a CMY image to detect an edge in each CMY color simultaneously;

C) performing an edge detection by determining a presence of an edge feature by a gray level difference in the document to be printed, no process being carried out if no edge feature is detected, an edge feature being recorded if the edge feature is detected;

D) allocating a feature record of an edge pixel according to a change in a printing mode to determine whether each edge pixel is printed; and E) performing a conversion of CMY edge pixels to CMKY edge pixels, wherein said step of allocating includes the step of processing a white pixel feature first and a black pixel feature secondly by one of an OR operation or an AND operation to process and addition of a pixel feature under the printing mode, the direction feature of each white pixel being in correspondence to a white pixel in the printing mode, the direction feature of each black pixel being in correspondence to a black pixel in the printing mode.

6. A method of real-time enhancing printing quality of gray level and color images, comprising steps as follows:

A.) performing a CMKY halftone process wherein a document to be printed is converted to a CMKY image and a halftone process is carried out for each CMKY color to determine a color of a pixel in an image to be printed;

B.) performing a CMY conversion wherein document to be printed is converted to a CMY image to detect an edge in each CMY color simultaneously;

C.) performing an edge detection by determining a presence of an edge feature by a gray level difference in the document to be printed, no process being carried out if no edge feature is detected, an edge feature being recorded if the edge feature is detected, the edge feature being detected by a process including calculating image data covered by an m by n window, an edge threshold being modified by the edge feature of an edge gray level difference by an edge operator, and the recording of the edge feature of an edge pixel being found by an edge directive from the edge operator, an edge feature value in a row larger than an initial edge threshold is weighted and averaged to modify the edge threshold and provide the edge threshold of a next row of image to be printed;

D.) allocating a feature record of an edge pixel according to a change in a printing mode to determine whether each edge pixel is printed; and, E.) performing a conversion of CMY edge pixels to CMKY edge pixels.

* * * * *